(12) United States Patent
Wang et al.

(10) Patent No.: US 12,515,209 B2
(45) Date of Patent: Jan. 6, 2026

(54) NITROGEN-DOPED CARBON-WRAPPED NICKEL CATALYST FOR SYNTHESIS OF HIGHER ALCOHOLS BY ASSEMBLY OF BIOETHANOL AND PREPARATION METHOD THEREFOR

(71) Applicant: GUANGDONG UNIVERSITY OF TECHNOLOGY, Guangdong (CN)

(72) Inventors: Tiejun Wang, Guangdong (CN); Songbai Qiu, Guangdong (CN); Qian Zhang, Guangdong (CN); Xiaoping Wu, Guangdong (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/097,967

(22) Filed: Apr. 2, 2025

(65) Prior Publication Data
US 2025/0256272 A1    Aug. 14, 2025

Related U.S. Application Data

(63) Continuation-in-part of application No. PCT/CN2021/127575, filed on Oct. 29, 2021.

(30) Foreign Application Priority Data

Mar. 9, 2021 (CN) .......................... 202110256353.8

(51) Int. Cl.
B01J 23/755 (2006.01)
B01J 27/24 (2006.01)
B01J 37/04 (2006.01)
B01J 37/08 (2006.01)
C07C 29/34 (2006.01)

(52) U.S. Cl.
CPC .......... B01J 37/088 (2013.01); B01J 23/755 (2013.01); B01J 27/24 (2013.01); B01J 37/04 (2013.01); B01J 37/084 (2013.01); C07C 29/34 (2013.01)

(58) Field of Classification Search
CPC ........ B01J 37/088; B01J 23/755; B01J 27/24; B01J 37/04; B01J 37/084; C07C 29/34
See application file for complete search history.

(56) References Cited

U.S. PATENT DOCUMENTS

2017/0015610 A1   1/2017   Jones et al.
2019/0300463 A1  10/2019   Corma Canos et al.

FOREIGN PATENT DOCUMENTS

| CN | 105712840 A | 6/2016 |
|----|-------------|--------|
| CN | 109003825 A | 12/2018 |
| CN | 109896923 A | 6/2019 |
| CN | 110247070 A | 9/2019 |
| CN | 111217673 A | 6/2020 |
| CN | 117943025 A | 4/2024 |

OTHER PUBLICATIONS

Energy Fuels 2017, 31, 5751-5775 (Garcia-Nunez et al.) (Year: 2017).*
RSC Adv. 2016, 6, 12737-12743 (Dong et al.) (Year: 2016).*
CN110247070A (Guan et al.; IDS reference; English language machine translation) (Year: 2019).*
CN111217673A (Pang et al.; IDS reference; English language machine translation) (Year: 2020).*
Ind. Eng. Chem. Res. 2013, 52, 12025-12031 (Chen et al.) (Year: 2013).*
Micropor. Mesopor. Mat. 2021, 311, 110676, pp. 1-8 (Han et al.) (Year: 2020).*
Dahao Jiang et al., Continuous catalytic upgrading of ethanol to n-butanol over Cu—CeO2/AC catalysts, Chemical Communications, 2016, pp. 13749-13752, vol. 52.
Notice of Allowance of counterpart Chinese Patent Application No. 202110256353.8 issued on Apr. 22, 2022.
First Office Action of counterpart Chinese Patent Application No. 202110256353.8 issued on Feb. 9, 2022.
International Search Report of PCT Patent Application No. PCT/CN2021/127575 issued on Jan. 26, 2022.

* cited by examiner

*Primary Examiner* — Amy C Bonaparte
*Assistant Examiner* — Derek Rhoades

(57) ABSTRACT

The present invention relates to a nitrogen-doped carbon-wrapped nickel catalyst for synthesis of higher alcohols by assembly of bioethanol and a preparation method therefor. The preparation method includes the following steps: S1, subjecting a soluble nickel salt and polyacrylamide to stirring with water, completely dissolving and then drying to obtain a precursor, where a molar ratio of the soluble nickel salt to polyacrylamide is 1:(0.5-8); and S2, subjecting the precursor to pyrolysis in an inert atmosphere at 300° C.-800° C. for 1-6 hours to obtain the nitrogen-doped carbon-wrapped nickel catalyst. The catalyst prepared by the method of the present invention has an active phase with high dispersity which enables synthesis of higher alcohols by efficient assembly of small molecules, and has relatively high stability which can still maintain high conversion rate and high yield for organic phase after 10 times of repeated use.

7 Claims, 4 Drawing Sheets

NITROGEN-DOPED CARBON-WRAPPED NICKEL CATALYST FOR SYNTHESIS OF HIGHER ALCOHOLS BY ASSEMBLY OF BIOETHANOL AND PREPARATION METHOD THEREFOR

CROSS-REFERENCE TO RELATED APPLICATIONS

The present application is a continuation-in-part application of PCT application No. PCT/CN2021/127575 filed on Oct. 29, 2021, which claims the benefit of Chinese Patent Application No. 202110256353.8 filed on Mar. 9, 2021. The contents of all of the aforementioned applications are incorporated by reference herein in their entirety.

TECHNICAL FIELD

The present invention relates to the technical field of catalyst, and more particularly, relates to a nitrogen-doped carbon-wrapped nickel catalyst for synthesis of higher alcohols by assembly of bioethanol and a preparation method therefor.

BACKGROUND

Excessive consumption of fossil resources leads to increasingly severe environmental problems, and thus development and utilization of renewable resources are concerned generally by people. Biomass is the sole carbon-contained renewable resource, it is of great significance in energy conservation and emission reduction and establishment of sustainable society to convert biomass into fuels, chemicals and platform chemical compounds. As one of the most important large amount of biomass chemical products, bioethanol can be obtained by conversion manners such as biofermentation or catalysis of biomass resources such as straw and withered grass which can be obtained in large quantities. In United States and Brazil, gasoline has been added with 10% of ethanol (E10), while E10 gasoline is under gradual popularization in China. However, ethanol is a short-chain lower alcohol which tends to absorb water, leading to a series of issues like corrosion to engine and difficult storage. Besides, most of the bioethanol is generated by biofermentation, and thus it contains high content of water but low concentration of ethanol.

Higher alcohols are important platform chemical compounds with good hydrophobicity, lower solubility in water and being easy to separate and purify, compared with lower alcohols, and thus usually used as extraction agent in fine chemical engineering. Meanwhile, compared with lower alcohols like ethanol, higher alcohols have greater energy density and less corrosion to engine. Isomeric higher alcohol with branched chains in the molecular backbone has higher octane number, which is expected to be a novel clean energy. Bioethanol can be assembled into higher alcohols rich in branched chains through Guerbet reaction in aqueous phase. The process of generating higher alcohols by carbon-carbon coupling of bioethanol through Guerbet reaction is divided into three parts: (1) alcohol dehydrogenation via catalysis of metal catalyst; (2) aldol condensation via catalysis of base; (3) hydrogenation of aldol condensation product through metal catalyst. Metal catalyst/base catalyst is generally used in the whole reaction system. According to the mechanism of Guerbet, on most oxide catalysts, ethanol dehydrogenation is the rate controlling step for the conversion of lower alcohols to higher alcohols. It is generally believed that the dehydrogenation of ethanol is catalyzed by alkaline centers, while the hydrogenation of intermediates is catalyzed by Lewis acids or alkaline centers, and the addition of metal centers can promote dehydrogenation/hydrogenation and significantly reduce the reaction temperature. Currently, most commonly used efficient hydrogenation-dehydrogenation catalysts are transition metal catalyst systems such as Ru complexes, Ir complexes, Ir, Ru, Rh, Pd, Pt, etc. However, noble metals and their metal complexes have problems such as high prices, difficult recovery, and instability in the aqueous phase.

Transition metal Ni is widely used for being a catalyst with good hydrogenation/dehydrogenation performance. With abundant reserve volume, Ni is expected to be a substitute to noble metal catalyst. Jiang, ect. (Jiang D, Wu X, Mao J, et al. Continuous catalytic upgrading of ethanol to n-butanol over Cu—$CeO_2$/AC catalysts[J]. *Chemical Communications*, 2016, 52: 13749-13752) discloses a nickel-based catalyst Ni—$CeO_2$/AC for converting small molecular alcohols into higher alcohols. However, due to its strong metallicity, such catalyst leads to excessive dehydrogenation during the conversion of small molecular alcohols to higher alcohols, resulting in C—C bond breakage and methanation, low efficiency in formation of C4+ higher alcohols and low utilization of bioethanol.

SUMMARY

The primary objective of the present invention is to provide a preparation method for a nitrogen-doped carbon-wrapped nickel catalyst for synthesis of higher alcohols by assembly of bioethanol, so as to overcome the issue that during the synthesis of higher alcohols from small molecular alcohols in aqueous phase by using a nickel-based catalyst, excessive dehydrogenation leads to C—C bond breakage and methanation, resulting in low catalytic efficiency.

Another objective of the present invention is to provide a nitrogen-doped carbon-wrapped nickel catalyst for synthesis of higher alcohols by assembly of bioethanol.

A further objective of the present invention is to provide use of the above-mentioned nitrogen-doped carbon-wrapped nickel catalyst for synthesis of higher alcohols by assembly of bioethanol.

The above objectives are achieved by the following technical solutions:

A preparation method for a nitrogen-doped carbon-wrapped nickel catalyst for synthesis of higher alcohols by assembly of bioethanol, includes the following steps:

S1, subjecting a soluble nickel salt and polyacrylamide to stirring with water, completely dissolving and then drying to obtain a precursor; wherein a molar ratio of the soluble nickel salt to polyacrylamide is 1:(0.5-8); and S2, subjecting the precursor to pyrolysis in an inert atmosphere at 300° C.-800° C. for 1-6 hours to obtain the nitrogen-doped carbon-wrapped nickel catalyst.

Nitrogen doping is used in the present invention to modify Ni, so that $Ni_3N$ and a nitrogen-doped carbon layer are formed where Ni is connected with the nitrogen-doped carbon layer by bonds, thus the electron structure of Ni is changed, and simultaneously the synergistic effect of a small amount of $Ni_3N$ active phase generated with the nitrogen-doped carbon wrapping layer weakens the metallicity of Ni, which can effectively solve the technical problem of severe methanation and low catalytic efficiency in the synthesis of higher alcohols from small molecular alcohols in aqueous phase using the existing nickel-based catalysts.

Preferably, the molar ratio of the soluble nickel salt to polyacrylamide is 1:(1-6), and more preferably 1:(1-3).

Preferably, the polyacrylamide has an average molecular weight of 2 million to 14 million.

In the present invention, the soluble nickel salt may be a conventional nickel salt in the art. Preferably, the soluble nickel salt is selected from one or more of nickel nitrate, nickel formate, nickel acetate, nickel chloride, and nickel sulfate.

Preferably, the drying is performed as follows: drying at 50° C.-120° C. for 12-100 hours.

Preferably, the pyrolysis is performed as follows: heating to 400° C.-700° C. by a heating rate of 1-30° C./min and performing heat preservation for 2-5 hours.

A nitrogen-doped carbon-wrapped nickel catalyst for synthesis of higher alcohols by assembly of bioethanol is prepared by the above-mentioned method.

The present invention also protects use of the above-mentioned nitrogen-doped carbon-wrapped nickel catalyst for synthesis of higher alcohols by assembly of bioethanol in synthesis of higher alcohols from a small molecular alcohol.

Preferably, the small molecular alcohol is ethanol, and the higher alcohols are isomeric alcohols having carbon atoms of 4-16. Particularly, the isomeric alcohol having carbon atoms of 4-16 may be n-butanol, 2-ethyl-1-butanol, n-hexanol, 2-ethyl-1-hexanol, n-octanol, 2-ethyloctanol, n-decanol, or isomeric C10+ alcohol, etc. The nitrogen-doped carbon-wrapped nickel catalyst of the present invention has a relatively high selectivity when used for catalyzing ethanol to synthesize the isomeric alcohol having carbon atoms of 4-16.

Synthesis of higher alcohols by assembly of bioethanol through using the nitrogen-doped carbon-wrapped nickel catalyst provided by the present invention has the following steps:

Bioethanol is catalyzed synergistically by the nitrogen-doped carbon-wrapped nickel catalyst prepared and a homogeneous base in a 60 ml steel high-pressure slurry bed reactor for coupling to synthesize higher alcohols, where a mass ratio of catalyst to NaOH to ethanol to water is 0.06:0.17:2:2, a reaction temperature is 180° C.-250° C., an initial pressure is 0.1 MPa, a reaction duration is 6-48 hours, and a liquid phase product is subjected to detection and analysis via gas chromatography after centrifugation and purification.

Compared with the prior art, the present invention has the following beneficial effects:

In the present invention, the soluble nickel salt and polyacrylamide are used as raw materials to prepare a precursor, and a nitrogen-doped carbon-wrapped nickel catalyst for synthesis of higher alcohols by assembly of bioethanol is prepared by subjecting the precursor to pyrolysis in an inert atmosphere. The catalyst prepared by the method of the present invention has an active phase with high dispersity which enables synthesis of higher alcohols by efficient assembly of small molecules, and has relatively high stability which can still maintain high conversion rate and high yield for organic phase after 10 times of repeated use.

DETAILED DESCRIPTION OF PREFERRED EMBODIMENTS

Figure 1:
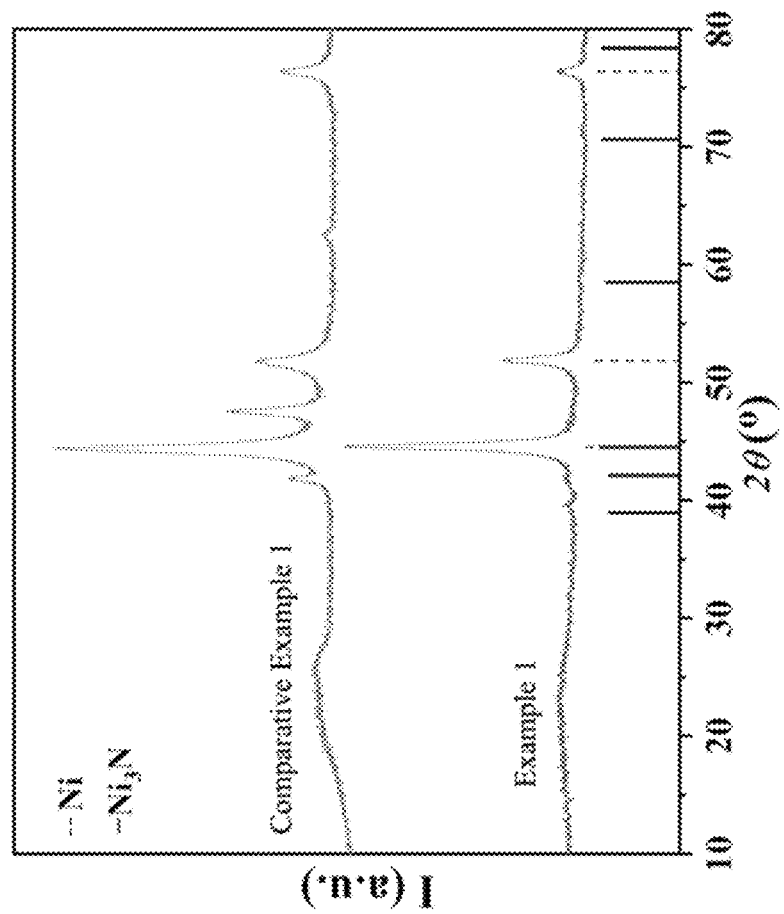
FIG. 1 is a X-ray powder diffraction (XRD) diagram of nitrogen-doped carbon-wrapped nickel catalysts prepared in Example 1 and Comparative Example 1.

In order to provide a clearer and more complete description of the technical solution of the present invention, the following specific embodiments are used to further illustrate the present invention. It should be understood that the specific embodiments described herein are only for the purpose of explaining the present invention and are not intended to limit the present invention. Various changes can be made within the scope of the claimed invention. Polyacrylamide used in the present invention was purchased from Aladdin and Macklin, with the product number P108471 (molecular weight: 2 million-14 million), P821239 (molecular weight: 5 million), P821240 (molecular weight: 7 million), P821241 (molecular weight: 12 million) and P821242 (molecular weight: 14 million).

Example 1

A preparation method for a nitrogen-doped carbon-wrapped nickel catalyst for synthesis of higher alcohols by assembly of bioethanol includes the following steps:

S1, weighing nickel acetate and polyacrylamide (average molecular weight of 2 million to 14 million) according to a molar ratio of 1:2, stirring with water, and heating at 100° C. until nickel acetate and polyacrylamide were completely dissolved, and then drying at 70° C. for 24 hours to obtain a hard and green complex precursor; and S2, subjecting the precursor upon drying to pyrolysis in an inert atmosphere at 500° C. for 6 hours, by a heating rate of 10° C./min, to obtain the nitrogen-doped carbon-wrapped nickel catalyst, where a nitrogen content determined by elemental analysis was 6.86 wt %.

Example 2

The present example is the second example of the present invention, and differs from Example 1 in that the molar ratio of nickel salt to polyacrylamide was 1:3.

Example 3

The present example is the third example of the present invention, and differs from Example 1 in that the molar ratio of nickel salt to polyacrylamide was 1:6.

Example 4

The present example is the fourth example of the present invention, and differs from Example 1 in that the molar ratio of nickel salt to polyacrylamide was 1:8.

Example 5

The present example is the fifth example of the present invention, and differs from Example 1 in that the molar ratio of nickel salt to polyacrylamide was 1:1.

Example 6

The present example is the sixth example of the present invention, and differs from Example 1 in that the molar ratio of nickel salt to polyacrylamide was 1:0.5.

Example 7

The present example is the seventh example of the present invention, and differs from Example 1 in that the temperature of pyrolysis was 700° C.

Example 8

The present example is the eighth example of the present invention, and differs from Example 1 in that the temperature of pyrolysis was 800° C.

Example 9

The present example is the ninth example of the present invention, and differs from Example 1 in that the temperature of pyrolysis was 400° C.

Example 10

The present example is the tenth example of the present invention, and differs from Example 1 in that the temperature of pyrolysis was 300° C.

Example 11

The present example is the eleventh example of the present invention, and differs from Example 1 in that the nickel salt is nickel nitrate, and the heating rate of pyrolysis is temperature of pyrolysis was 1° C./min.

Example 12

The present example is the twelfth example of the present invention, and differs from Example 1 in that the nickel salt is nickel chloride, and the heating rate of pyrolysis is temperature of pyrolysis was 10° C./min.

Example 13

The present example is the twelfth example of the present invention, and differs from Example 1 in that the nickel salt is nickel formate, and the heating rate of pyrolysis is temperature of pyrolysis was 20° C./min.

Example 14

The present example is the twelfth example of the present invention, and differs from Example 1 in that the nickel salt is nickel sulfate, and the heating rate of pyrolysis is temperature of pyrolysis was 30° C./min.

Comparative Example 1

The present example is the first comparative example of the present invention, and a preparation method for a catalyst of the present comparative example includes the following steps:

weighing nickel nitrate and polyacrylamide according to a molar ratio of 1:2, stirring with water, and heating at 100° C. until nickel acetate and polyacrylamide were completely dissolved, and then drying at 50° C. for 100 hours to obtain a hard and green complex precursor; and subjecting the precursor upon drying to pyrolysis in an inert atmosphere at 500° C. for 2 hours, by a heating rate of 30° C./min, to obtain the catalyst.

Comparative Example 2

The present comparative example is the second comparative example of the present invention, and the catalyst in the present comparative example is Ni—$CeO_2$/AC.

Comparative Example 3

The present comparative example is the third comparative example of the present invention, and differs from Example 1 in that the molar ratio of nickel salt to polyacrylamide was 1:0.3.

Comparative Example 4

The present comparative example is the fourth comparative example of the present invention, and differs from Example 1 in that the molar ratio of nickel salt to polyacrylamide was 1:9.

Comparative Example 5

The present comparative example is the fifth comparative example of the present invention, and differs from Example 1 in that polyacrylamide was replaced by chitosan as the nitrogen resource.

Characterization and Test

FIG. 1 is a X-ray powder diffraction (XRD) diagram of the nitrogen-doped carbon-wrapped nickel catalysts prepared in Example 1 and Comparative Example 1. It can be seen from FIG. 1 that the catalyst of Example 1 has typical diffraction peaks of metal Ni, with a small amounts of crystal phase diffraction peaks of $Ni_3N$; while the catalyst of Comparative Example 1 only has typical diffraction peaks of metal Ni. XRD diagrams of the catalysts of Examples 2-14 are basically the same as that of Example 1.

Figure 2:
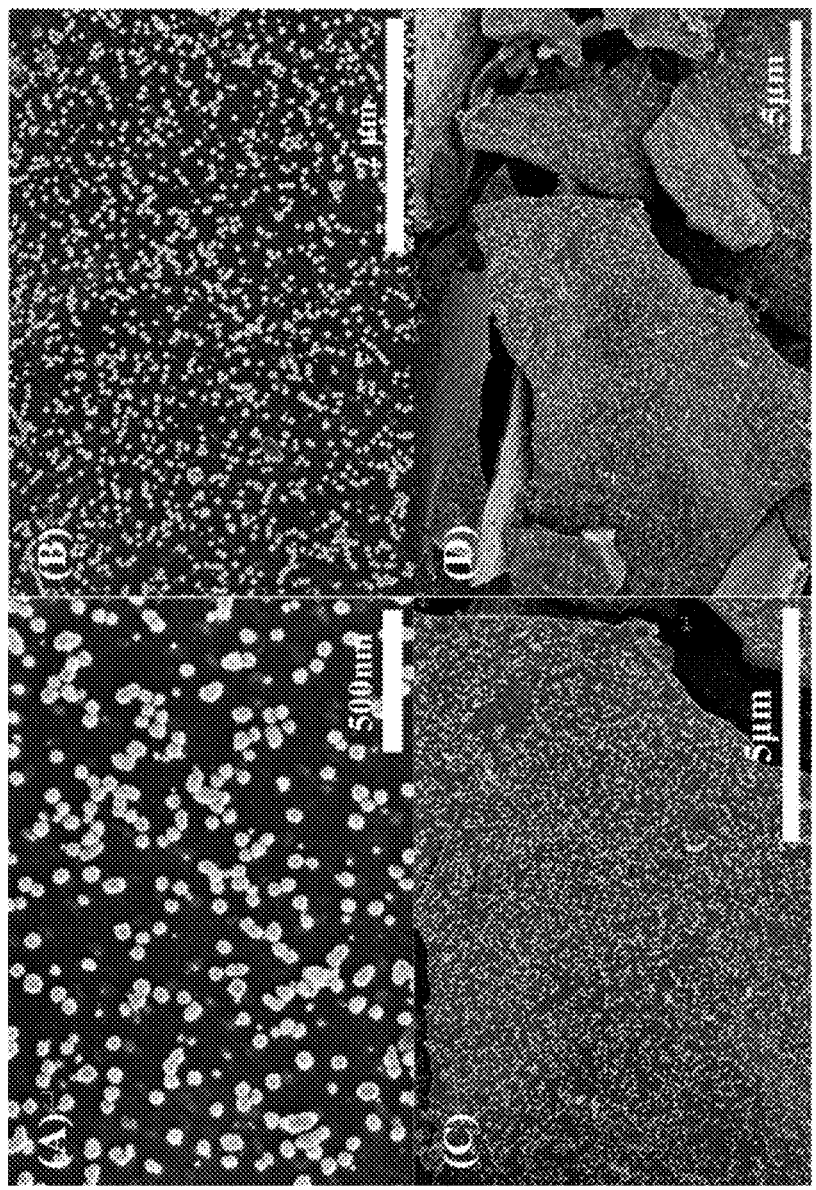
FIG. 2 is a scanning electron microscope (SEM) diagram of the nitrogen-doped carbon-wrapped nickel catalyst prepared in Example 1.

FIG. 2 is a scanning electron microscope (SEM) diagram of the nitrogen-doped carbon-wrapped nickel catalyst prepared in Example 1. It can be seen from FIG. 2 that appearance of the nitrogen-doped carbon-wrapped nickel catalyst shows a nitrogen-doped carbon layer in flake inlaid with nanoparticles of Ni and $Ni_3N$, where the nanoparticles has a uniform size and disperses on the carbon layer in flake. SEM diagrams of the catalysts of Examples 2-14 are basically the same as that of Example 1.

Figure 3:
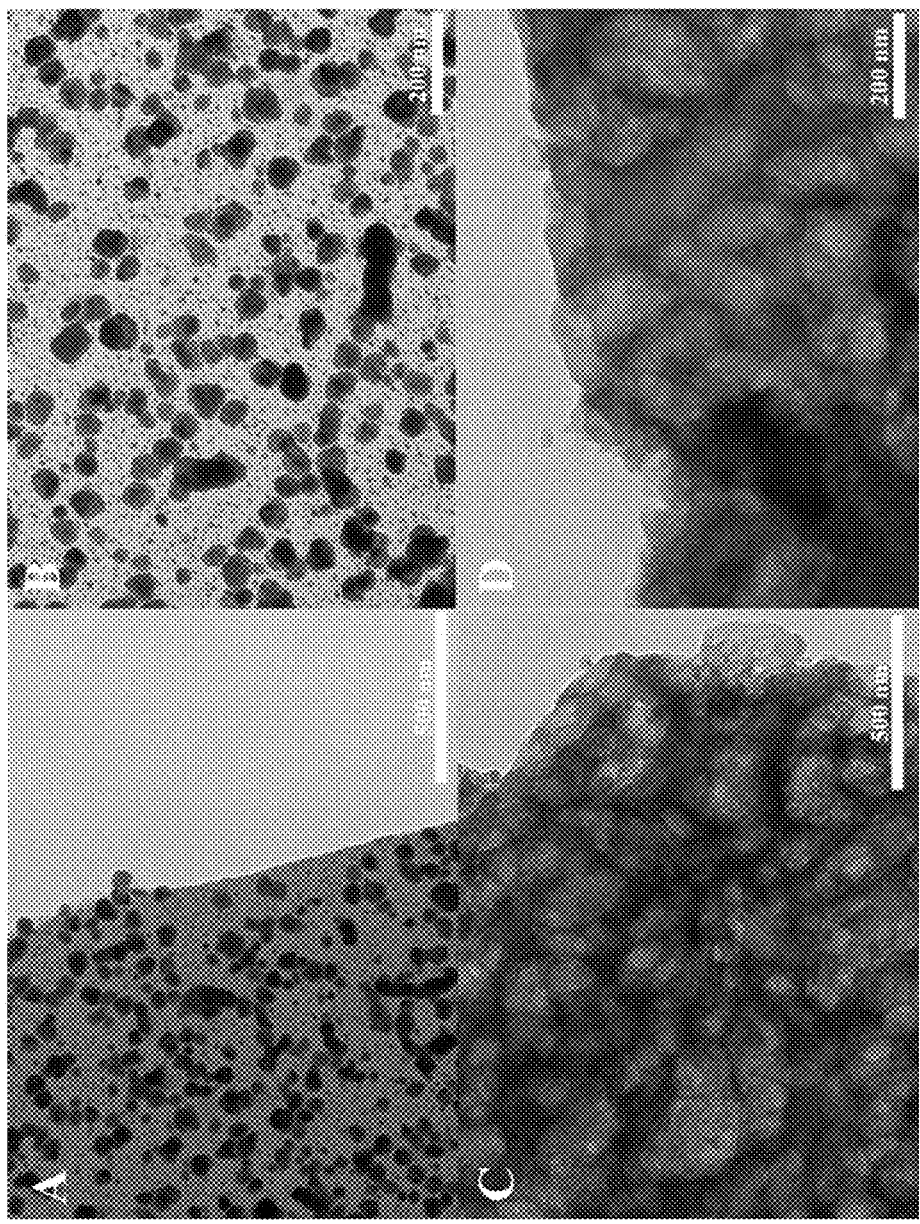
FIG. 3 is a transmission electron microscope (TEM) diagram of a carbon layer of the nitrogen-doped carbon-wrapped nickel catalyst prepared in Example 1 before and after acid etching.

FIG. 3 is a transmission electron microscope (TEM) diagram of a carbon layer of the nitrogen-doped carbon-wrapped nickel catalyst prepared in Example 1 before and after acid etching. A and B in FIG. 3 show that the Ni nanoparticles are uniformly wrapped in the nitrogen-doped carbon layer, having a particle size distribution of 40 nm-60 nm. C and D in FIG. 3 show the residual carbon layer after acid etching, indicating that the Ni nanoparticles were removed after being dissolved and washed by acid, and only nano holes were left. The nitrogen-doped carbon-wrapped nickel catalyst prepared by the method of the present invention can sufficiently expose its active sites. TEM diagrams of the catalysts of Examples 2-14 are basically the same as that of Example 1.

Figure 4:
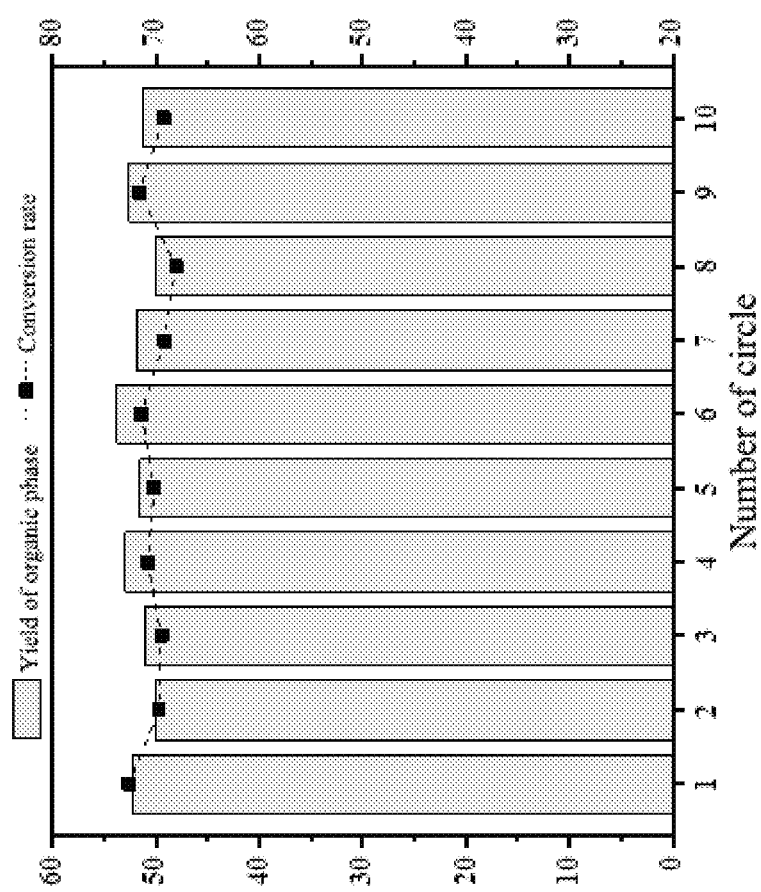
FIG. 4 is a data plot of stability test of the nitrogen-doped carbon-wrapped nickel catalyst prepared in Example 1.

FIG. 4 is a data plot of stability test of the nitrogen-doped carbon-wrapped nickel catalyst prepared in Example 1. It can be seen from FIG. 4 that the catalyst still maintains high conversion rate and high yield for organic phase after 10 times of repeated use, indicating that the catalyst has high stability.

The catalysts prepared by Examples 1-14 and Comparative Examples 1-5 was respectively added to a 60 ml steel high-pressure slurry bed reactor, with a homogeneous base to synergistically catalyze ethanol for coupling synthesize higher alcohols, where a mass ratio of catalyst to NaOH to ethanol to water was 0.06:0.17:2:2, a reaction temperature was 230° C., an initial pressure was 0.1 MPa, a reaction duration was 12 hours; after the reaction was finished, cooling to room temperature was performed, and a gas phase and a liquid phase product were collected; then magnetic separation was performed to separate the catalyst and the reaction product, and after settling, the liquid phase product can be spontaneously separated into a water phase and an oil phase mainly containing C4+ alcohols, and the liquid phase product upon separation was subjected to detection and analysis via gas chromatography. The analysis results are shown in Table 1.

The catalyst of Comparative Example 2 is Ni—$CeO_2$/AC. Due to the strong metallicity of Ni, such catalyst led to excessive dehydrogenation during catalysis of converting small molecular alcohols to higher alcohols, resulting in C—C bond breakage and methanation, where the selectivity in C4+ alcohols in organic phase is only 61.21%, and the ethanol conversion rate is only 56.71%.

In Comparative Example 3 and Comparative Example 4, the amount of polyacrylamide is too less or too much, so that the ethanol conversion rate, the yield of organic phase and the selectivity in C4+ alcohols are all lower.

In Comparative Example 5, polyacrylamide was replaced by chitosan as the nitrogen source, so that the ethanol conversion rate, the yield of organic phase and the selectivity in C4+ alcohols are all lower, being 40.52%, 20.47% and 6.22%, respectively.

Obviously, the above embodiments of the present invention are only examples provided to clearly illustrate the present invention, and are not limitations on the embodiments of the present invention. For those skilled in the art, other forms of changes or modifications can be made based on the above explanation. It is not necessary and impossible to exhaustively list all implementation methods here. Any modifications, equivalent substitutions, and improvements made within the spirit and principles of the present invention shall be included within the scope of protection of the claims of the present invention.

TABLE 1

|  | Molar ratio of nickel salt to polymer | Temperature of pyrolysis (° C.) | Ethanol conversion rate (C-mol %) | Yield for organic phase (C-mol %) | Selectivity in C4+ alcohols in organic phase (%) |
|---|---|---|---|---|---|
| Example 1 | 1:2 | 500 | 72.62 | 52.24 | 84.71 |
| Example 2 | 1:3 | 500 | 61.42 | 43.12 | 86.52 |
| Example 3 | 1:6 | 500 | 49.14 | 35.24 | 89.67 |
| Example 4 | 1:8 | 500 | 34.83 | 22.31 | 91.84 |
| Example 5 | 1:1 | 500 | 60.42 | 40.49 | 82.95 |
| Example 6 | 1:0.5 | 500 | 57.08 | 34.32 | 80.51 |
| Example 7 | 1:2 | 700 | 59.98 | 42.98 | 90.47 |
| Example 8 | 1:2 | 800 | 40.22 | 35.58 | 96.32 |
| Example 9 | 1:2 | 400 | 66.34 | 45.89 | 80.17 |
| Example 10 | 1:2 | 300 | 50.24 | 33.56 | 78.23 |
| Example 11 | 1:2 | 500 | 70.36 | 52.65 | 84.01 |
| Example 12 | 1:2 | 500 | 70.98 | 51.67 | 85.21 |
| Example 13 | 1:2 | 500 | 72.11 | 50.36 | 84.45 |
| Example 14 | 1:2 | 500 | 71.76 | 52.01 | 84.05 |
| Comparative Example 1 | 1:2 | 500 | 68.42 | 18.45 | 54.41 |
| Comparative Example 2 | — | — | 56.71 | 29.41 | 61.21 |
| Comparative Example 3 | 1:0.3 | 500 | 30.01 | 15.52 | 50.74 |
| Comparative Example 4 | 1:9 | 500 | 20.63 | 12.16 | 98.14 |
| Comparative Example 5 | 1:2 | 500 | 40.52 | 20.47 | 76.22 |

It can be known from the results of Examples 1-14 in Table 1 that the nitrogen-doped carbon-wrapped nickel catalysts prepared according to different ratios and pyrolysis temperatures all have good selectivity in higher alcohols, where the nitrogen-doped carbon-wrapped nickel catalyst prepared in the conditions of a ratio of nickel salt to polyacrylamide being 1:2 and a pyrolysis temperature being 500° C. has the best catalytic activity.

The catalyst of Comparative Example 1 only has a phase containing nickel, without doping nitrogen, leading to severe methanation and low efficiency in synthesis of higher alcohols, where the yield of organic phase is 18.45% and the selectivity in C4+ alcohols in organic phase is only 54.41%.

What is claimed is:

1. A preparation method for a nitrogen-doped carbon-wrapped nickel catalyst for synthesis of higher alcohols by assembly of bioethanol, wherein the preparation method comprises the following steps:
    S1, subjecting a soluble nickel salt and polyacrylamide to stirring in water, completely dissolving and then drying through heating to obtain a precursor; wherein a molar ratio of the soluble nickel salt to polyacrylamide is 1:(0.5-8), calculated based on (i) moles of $Ni^{2+}$ derived from the soluble nickel salt and (ii) moles of acrylamide monomer units ($C_3H_5NO$) constituting the polyacrylamide; and S2, subjecting the precursor to pyrolysis in an inert atmosphere at 300° C.-800° C. for 1-6 hours to obtain a nitrogen-doped carbon-wrapped nickel catalyst;

wherein the nitrogen-doped carbon-wrapped nickel catalyst is in flakes inlaid with nanoparticles of Ni and $Ni_3N$.

2. The preparation method for a nitrogen-doped carbon-wrapped nickel catalyst for synthesis of higher alcohols by assembly of bioethanol according to claim 1, wherein the molar ratio of the soluble nickel salt to polyacrylamide is 1:(1-6).

3. The preparation method for a nitrogen-doped carbon-wrapped nickel catalyst for synthesis of higher alcohols by assembly of bioethanol according to claim 1, wherein the molar ratio of the soluble nickel salt to polyacrylamide is 1:(1-3).

4. The preparation method for a nitrogen-doped carbon-wrapped nickel catalyst for synthesis of higher alcohols by assembly of bioethanol according to claim 1, wherein the soluble nickel salt is selected from one or more of nickel nitrate, nickel formate, nickel acetate, nickel chloride, and nickel sulfate.

5. The preparation method for a nitrogen-doped carbon-wrapped nickel catalyst for synthesis of higher alcohols by assembly of bioethanol according to claim 1, wherein the drying is performed as follows: drying at 50° C.-120° C. for 12-100 hours.

6. The preparation method for a nitrogen-doped carbon-wrapped nickel catalyst for synthesis of higher alcohols by assembly of bioethanol according to claim 1, wherein the pyrolysis is performed as follows: heating to 400° C.-700° C. by a heating rate of 1-30° C./min and performing heat preservation for 2-5 hours.

7. A nitrogen-doped carbon-wrapped nickel catalyst for synthesis of higher alcohols by assembly of bioethanol, wherein the catalyst is prepared by the method of claim 1.

* * * * *